United States Patent
Fields et al.

(10) Patent No.: US 12,198,196 B2
(45) Date of Patent: Jan. 14, 2025

(54) TECHNOLOGY FOR ANALYZING PREVIOUS VEHICLE USAGE TO IDENTIFY CUSTOMER OPPORTUNITIES

(71) Applicant: STATE FARM MUTUAL AUTOMOBILE INSURANCE COMPANY, Bloomington, IL (US)

(72) Inventors: Brian Mark Fields, Normal, IL (US); Aaron Williams, Congerville, IL (US); Kristopher Keith Gaudin, Bloomington, IL (US)

(73) Assignee: STATE FARM MUTUAL AUTOMOBILE INSURANCE COMPANY, Bloomington, IL (US)

( * ) Notice: Subject to any disclaimer, the term of this patent is extended or adjusted under 35 U.S.C. 154(b) by 617 days.

(21) Appl. No.: 15/696,868

(22) Filed: Sep. 6, 2017

(65) Prior Publication Data

US 2022/0067838 A1  Mar. 3, 2022

(51) Int. Cl.
*G06Q 40/00* (2023.01)
*G01C 21/34* (2006.01)
*G06Q 40/08* (2012.01)

(52) U.S. Cl.
CPC ......... *G06Q 40/08* (2013.01); *G01C 21/3461* (2013.01)

(58) Field of Classification Search
CPC .................................................... G06F 19/328
USPC .................. 705/4, 5, 3, 39, 38, 37; 340/905; 701/410, 484; 235/378, 379; 709/9, 226, 709/6
See application file for complete search history.

(56) References Cited

U.S. PATENT DOCUMENTS

| | | | | |
|---|---|---|---|---|
| 8,996,303 | B1 * | 3/2015 | Bogovich | G08G 1/096827 701/410 |
| 9,293,042 | B1 * | 3/2016 | Wasserman | G08G 1/09 |
| 9,311,271 | B2 | 4/2016 | Wright | |
| 9,466,154 | B2 * | 10/2016 | Akselrod | G07C 5/006 |
| 9,587,952 | B1 * | 3/2017 | Slusar | G01C 21/3623 |
| 9,633,487 | B2 | 4/2017 | Wright | |
| 9,646,428 | B1 * | 5/2017 | Konrardy | G06Q 10/0635 |
| 9,754,424 | B2 * | 9/2017 | Ling | G06Q 40/08 |

(Continued)

FOREIGN PATENT DOCUMENTS

| | | |
|---|---|---|
| EP | 3239686 A1 | 11/2017 |
| EP | 3578433 B1 | 8/2020 |

(Continued)

OTHER PUBLICATIONS

Ubiquitous community driven traffic analysis; 2015 International Symposium on Innovations in Intelligent Systems and Applications (INISTA) (pp. 1-8); Fabio Silva, Antonio Costa, Paulo Novais, Cesar Analide; Sep. 2, 2015. (Year: 2015).*

(Continued)

*Primary Examiner* — Tien C Nguyen
(74) *Attorney, Agent, or Firm* — MARSHALL, GERSTEIN & BORUN LLP

(57) ABSTRACT

Systems and approaches relate to, inter alia, identifying customer opportunities. The systems and approaches may monitor a plurality of routes traversed by a vehicle. The systems and approaches may then access historical route data for the plurality travel routes. The systems and approaches may further calculate a risk index based on the historical route data, and determine at least one customer opportunity based on the calculated risk index.

20 Claims, 7 Drawing Sheets

(56) References Cited

U.S. PATENT DOCUMENTS

| | | |
|---|---|---|
| 9,830,748 B2 | 11/2017 | Rosenbaum |
| 9,990,782 B2 | 6/2018 | Rosenbaum |
| 10,192,369 B2 | 1/2019 | Wright |
| 10,198,879 B2 | 2/2019 | Wright |
| 10,269,190 B2 | 4/2019 | Rosenbaum |
| 10,352,721 B2 * | 7/2019 | Eno ................... G01C 21/3679 |
| 10,467,824 B2 | 11/2019 | Rosenbaum |
| 10,984,479 B1 * | 4/2021 | Kyne ..................... H04L 67/12 |
| 11,017,475 B1 * | 5/2021 | Dunham ................ G06Q 40/08 |
| 11,227,452 B2 | 1/2022 | Rosenbaum |
| 11,407,410 B2 | 8/2022 | Rosenbaum |
| 11,524,707 B2 | 12/2022 | Rosenbaum |
| 11,594,083 B1 | 2/2023 | Rosenbaum |
| 2012/0123806 A1 * | 5/2012 | Schumann, Jr. ....... G06Q 40/08 705/4 |
| 2012/0166229 A1 * | 6/2012 | Collins ................. G06Q 40/08 705/4 |
| 2014/0350970 A1 * | 11/2014 | Schumann, Jr. ............................ G08G 1/096775 705/4 |
| 2015/0170287 A1 * | 6/2015 | Tirone .................. G06Q 40/08 705/4 |
| 2015/0178849 A1 * | 6/2015 | Berger .................. G06Q 40/08 705/4 |
| 2016/0086285 A1 * | 3/2016 | Jordan Peters .. G08G 1/096827 701/484 |
| 2016/0379486 A1 * | 12/2016 | Taylor ..................... G08G 1/08 340/905 |
| 2017/0242436 A1 * | 8/2017 | Creusot ............. G08G 1/09626 |
| 2017/0309092 A1 * | 10/2017 | Rosenbaum ......... G07C 5/0808 |
| 2022/0092893 A1 | 3/2022 | Rosenbaum |
| 2022/0340148 A1 | 10/2022 | Rosenbaum |
| 2023/0060300 A1 | 3/2023 | Rosenbaum |

FOREIGN PATENT DOCUMENTS

| | | |
|---|---|---|
| EP | 3730375 B1 | 10/2021 |
| EP | 3960576 A1 | 3/2022 |
| EP | 4190659 A1 | 6/2023 |
| EP | 4190660 A1 | 6/2023 |

OTHER PUBLICATIONS

Towards Adaptive Mobile Mashups: Opportunities for Designing Effective Persuasive Technology on the Road; 2010 IEEE 24th International Conference on Advanced Information Networking and Applications Workshops (pp. 7-11); Salim, F.D.; Apr. 20, 2010. (Year: 2010).*

An adaptive routing system for location-aware mobile devices on the road network; 2011 14th International IEEE Conference on Intelligent Transportation Systems (ITSC) (pp. 1839-1845); Paul Borokhov, Sebastien Blandin, Olivier Goldschmidt, Alexandre Bayen, Samitha Samaranayake, Oct. 5, 2011. (Year: 2011).*

* cited by examiner

TECHNOLOGY FOR ANALYZING PREVIOUS VEHICLE USAGE TO IDENTIFY CUSTOMER OPPORTUNITIES

FIELD OF THE DISCLOSURE

The present disclosure generally relates to reducing vehicle collisions and increasing vehicular safety and, more particularly, to analyzing previous vehicle usage to identify customer opportunities.

BACKGROUND

Drivers and passengers assume a certain degree of risk of injury or property damage when travelling by vehicle. This risk may be mitigated by reducing or eliminating certain contributing factors. For example, a driver may avoid risky behavior, such as driving while intoxicated, driving while tired, or driving while texting. As another example, a driver may mitigate the risk of serious injury by driving a car with safety features such as airbags, seatbelts, and antilock brakes.

However, certain risk factors may not be mitigated. For example, the very nature of a vehicle may present certain inherent risks. A typical car may weigh thousands of pounds and may not always maneuver or stop quickly. When travelling at even a moderate speed, a collision may result in serious damage to the vehicle and serious injury to the occupants. Further, a driver or passenger of a vehicle may have no control over perhaps the greatest risk factor involved with driving: other drivers or passengers in other vehicles.

In some situations, environmental factors may contribute to the relative riskiness or safety of an area. For example, a driver approaching a one-lane bridge in a valley between two hills may not see the bridge until the vehicle has crested the hill. If the distance between the hill crest and the bridge is short, the driver may have little time to react if a second driver is approaching the bridge from the other direction. A driver may have little to no control over these environmental factors. Moreover, environmental factors contributing to the riskiness of an area may not always be readily apparent, observable, or quantifiable. For example, even if a civil engineer identifies a number of one-lane bridges as potentially dangerous, she may have no way of quantifying how risky these one-lane bridges are relative to one another. Additionally, the engineer may overlook a two-lane bridge that is seemingly safe, but which is in actuality riskier than many of the identified one-lane bridges. Because the environmental factors contributing to risk may not always be apparent, observable, or quantifiable, these environmental risk factors may go unnoticed. Thus, engineers and government officials may never identify certain high-risk areas, much less identify solutions to mitigate the risk and improve the safety of the areas for vehicle drivers and passengers.

Further, in some situations, a driver or passenger may be exposed to high risk traffic situations that occur in a seemingly random fashion. When relying on recommended routes from a navigation application or navigator when travelling through unfamiliar places, these high risk traffic situations may be potentially dangerous or they may merely significantly increase travel times. The routes may pass through hazardous areas, such as high risk intersections, road segments or portions of certain roads, abnormal traffic patterns, exit ramps, circular traffic flows, road construction areas, and the like, which may expose the driver or passenger to the risk of property damage, injury, time delay stemming from accidents, and the like.

In the event that a driver or passenger is presented with a suitable alternative route that avoids inherent or random risks, the driver may be deemed a low-risk driver. Avoiding these risks may reduce overall numbers of traffic incidents and can make roadways generally safer for all travelers.

SUMMARY

The present embodiments disclose systems and methods that may generally relate to identifying customer opportunities, and particularly, inter alia, to identifying or and presenting customer opportunities to a driver based on previous vehicle usage.

The previous vehicle usage may be monitored at any desired frequency to determine whether the routes traversed by a user are hazardous and/or risky. One way to measure route hazardousness is by calculating a risk index for the route driven that is based on the historical route data. The risk index quantifies how prone the route is to vehicle collisions as well as the occurrence of other, similar incidents such as citations and traffic stops. Further, the risk index quantifies whether the driver has a tendency to traverse risky routes while driving. When risk indices are calculated for more than one route, the risk indices may be compared to one another to enable a comparison of the relative riskiness of several routes driven by a driver.

Calculating the risk index may include using historical route data. The historical route data can be used to determine a number of observed collisions on the route over the time period. The number of observed collisions may be calculated based upon (a) historical traffic data for the route, and/or (b) historical traffic data for multiple routes. Examples of historical traffic data include historical auto insurance claim data, vehicle collision data, mobile device data, telematics data, vehicle mounted-sensor data, autonomous vehicle sensor data, smart infrastructure sensor data, and image data. The risk index is calculated based on a comparison between the number of observed collisions, the number of additional incidents occurring on the route, and other factors, and is then assigned to an individual.

Subsequent to calculating the risk index, the systems and methods may determine at least one customer opportunity based on the calculated risk index. Based on the calculated risk value assigned to the individual, any number of customer opportunities may be generated. For example, if the risk index is determined to be below a threshold value, the systems and method may provide an insurance premium having a predetermined discount applied thereto, a rebate offer as a form of compensation for past vehicle usage, and the likes. The systems and methods may generate a number of customer opportunities based on the value of the risk index.

In some examples, the systems and methods may present the customer opportunity to a device, which may be one of a mobile device, an on-board computer, and a navigator associated with a vehicle, operator or passenger of a vehicle, pedestrian, bicyclist, and the like. The systems and methods may present the customer opportunity based on receiving a request for an insurance premium for vehicular travel, via wireless communication or data transmission over one or more radio links or wireless communication channels.

In some embodiments, the systems and methods may further include generating a modified insurance premium based on the customer opportunity. This modified insurance premium may take into account the level of risk the driver previously has incurred while driving.

In some embodiments, the systems and methods may further include generating a notification based upon the customer opportunity. Such notification may be an audible, visual, or haptic alert indicative of the customer opportunity. The systems and methods may further transmit the generated notification to an electronic device (e.g., mobile device, an on-board computer, wearable electronics including an augmented reality appliance, and a navigator) associated with a vehicle, operator or passenger of a vehicle, pedestrian, bicyclist, and the likes, via wireless communication or data transmission over one or more radio links or wireless communication channels. The electronic devices may receive such notifications when an insurance policy is near expiration or at other predetermined times, for instance. The systems and methods may include additional, less, or alternate functionality, including that discussed elsewhere herein.

In some embodiments, a computer system may include a processor and one or more memory devices storing non-transitory computer readable instructions that when executed cause the processor to ascertain customer opportunities. The instructions may cause the processor to do any one or more of the following: monitor a plurality of routes traversed by a vehicle; (ii) access historical route data for the plurality of routes; (iii) calculate a risk index based on the historical route data for the plurality of routes; and (iv) determine at least one customer opportunity based on the calculated risk index.

Advantages will become more apparent to those skilled in the art from the following description of the preferred embodiments which have been shown and described by way of illustration. As will be realized, the present embodiments may be capable of other and different embodiments, and their details are capable of modification in various respects. Accordingly, the drawings and description are to be regarded as illustrative in nature and not as restrictive.

BRIEF DESCRIPTION OF THE DRAWINGS

The above needs are at least partially met through provision of the technology for analyzing vehicle usage to identify customer opportunities described in the following detailed description, particularly when studied in conjunction with the drawings, wherein.

Skilled artisans will appreciate that elements in the figures are illustrated for simplicity and clarity and have not necessarily been drawn to scale. For example, the dimensions and/or relative positioning of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments. It will further be appreciated that certain actions and/or steps may be described or depicted in a particular order of occurrence while those skilled in the art will understand that such specificity with respect to sequence is not actually required. It will also be understood that the terms and expressions used herein have the ordinary technical meaning as is accorded to such terms and expressions by persons skilled in the technical field as set forth above except where different specific meanings have otherwise been set forth herein.

DETAILED DESCRIPTION

Figure 1:
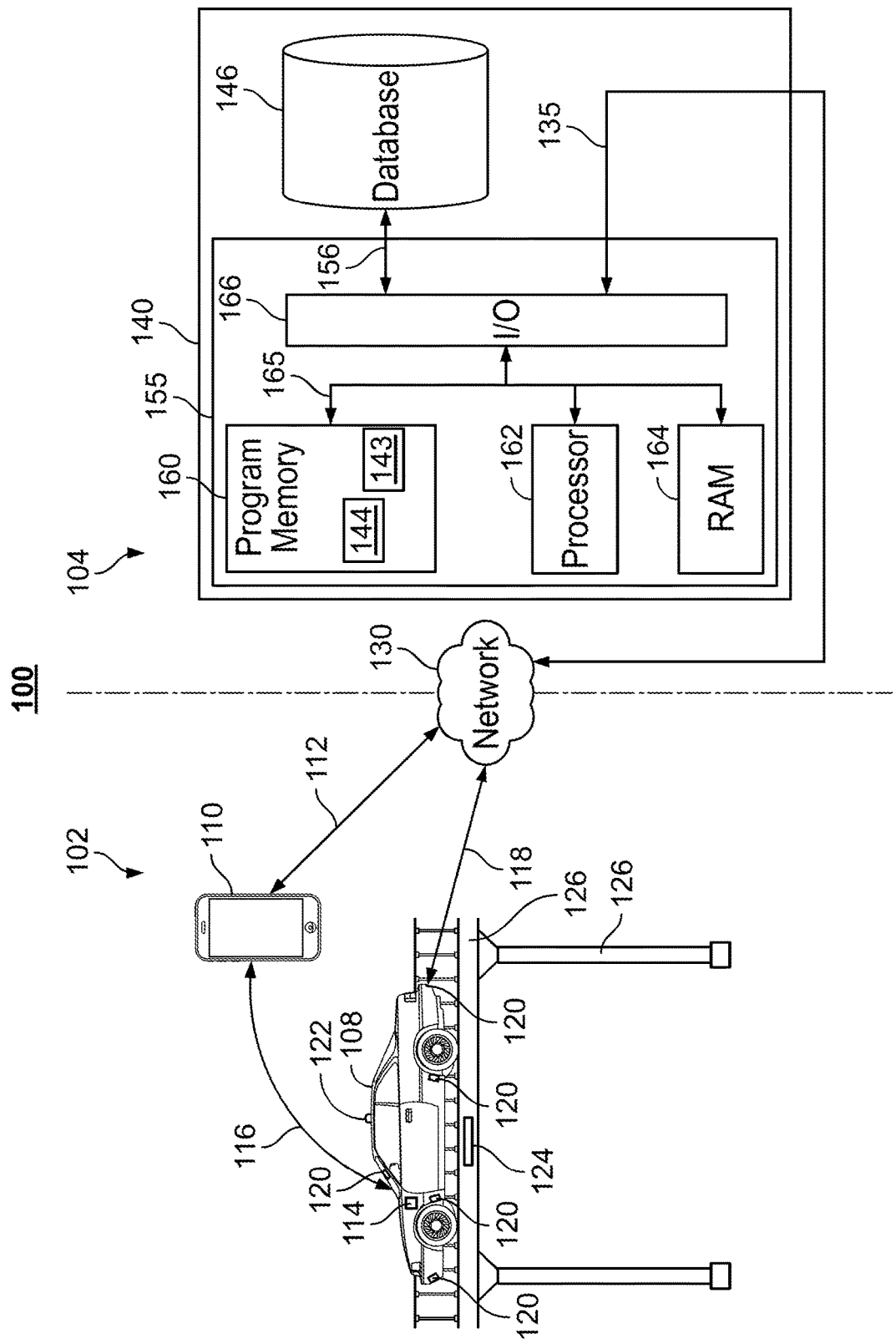
FIG. 1 illustrates a block diagram of an exemplary interconnected wireless communication system on which the methods described herein may be implemented.

FIG. 1 illustrates a block diagram of an interconnected wireless communication system 100 on which the methods described herein may be implemented. The communication system 100 may generally be divided into front-end components 102 and back-end components 104, both of which may include hardware and software applications, as well as various data communications channels for communicating data between the various hardware and software components. The front-end components 102 may generate or collect historical route and/or traffic data from mobile device-mounted sensors, vehicle-mounted sensors, smart infrastructure-mounted sensors, wearable electronics-mounted sensors, or other sensors.

The historical route data may be in the form of vehicle data, vehicle collision data, geographic location data (e.g., GPS data), telematics data, mobile device data, vehicle-mounted sensor data, auto insurance claim data, autonomous vehicle data, smart infrastructure sensor data, image data, or other data. The historical route data may provide contextual information of the vehicle 108 (e.g., a car, truck, motorcycle, bicycle), pedestrian, bicyclist, and the likes, related to traffic, vehicle damage, extent of injuries at a vehicle collision, number and identification of vehicles involved, dates and times of vehicle use, duration of vehicle use, mobile device GPS location, vehicle GPS location, speed, RPM or other tachometer readings of the vehicle, lateral and longitudinal acceleration of the vehicle, environment (e.g., construction, accidents in the area, weather, road condition), or other information relating to use of the vehicle 108. Historical route data may be collected before, during, and/or after vehicle collisions or incidents.

Front-end components 102 may include on-board computer 114, mobile device 110 (e.g., a smart phone, a cellular phone, a tablet computer, a special purpose or general use computing device, smart watch, wearable electronics such as augmented reality appliance, vehicle monitoring or control device, and the likes), one or more sensors 120 associated with vehicle 108, and a communication component 122. The on-board computer 114 may be a general-use on-board computer capable of performing any number of functions relating to vehicle operation or a dedicated computer for autonomous vehicle operation. Further, the on-board computer 114 may be originally installed by the manufacturer of the vehicle 108, or installed as an aftermarket modification or addition to the vehicle 108. Examples of sensors 120 include a GPS unit, a digital camera, a video camera, a LIDAR sensor, an ultrasonic sensor, an infrared sensor, an ignition sensor, an odometer, a system clock, a speedometer, a tachometer, an accelerometer, a gyroscope, a compass, a geolocation unit, radar unit, and an inductance sensor. Some of the sensors 120 (e.g., radar, LIDAR, or camera units) may actively or passively scan the vehicle environment for obstacles (e.g., other vehicles, buildings, pedestrians, etc.), roadways, lane markings, signs, or signals. Other sensors 120 (e.g., GPS, accelerometer, or tachometer units) may provide data for determining the location of and monitoring routes traversed by the vehicle 108. These sensors may be used to generate route data indicative of the routes traversed by the vehicle. Other sensors 120 may be directed to the interior or passenger compartment of the vehicle 108, such as cameras, microphones, pressure sensors, thermometers, or similar sensors to monitor the vehicle operator and/or passengers within the vehicle 108. The sensors 120 may also be removably or fixedly incorporated within or connected to the on-board computer 114 or the mobile device 110 and may be disposed in various arrangements.

In some embodiments, the on-board computer 114 or mobile device 110 may each be configured to execute one or more algorithms, programs, or applications to generate, collect, or analyze various types of historical route data from one or more sensors 120 mounted or installed within the vehicle 108. For instance, if vehicle 108 is an autonomous vehicle, the on-board computer 114 may collect data related to the autonomous features to assist the vehicle operator in operating the vehicle 108. The on-board computer 114 or mobile device 110 may further process the historical route data to calculate a risk index for a driver. In such embodiments, the on-board computer 114 or mobile device 110 may process the historical route data to determine customer opportunities for a driver based upon the risk index, and may further generate a virtual alert depicting the customer opportunity to display on the mobile device 110 or on-board computer 114 or take other actions.

In some embodiments, the mobile device 110 may supplement the functions performed by the on-board computer 114 described herein, in which case no on-board computer 114 may be present in the system 100. Additionally, the mobile device 110 and on-board computer 114 may communicate with one another directly over link 116 or indirectly over multiple radio links. One or more applications may generate and/or display a notification or alert indicating potential customer opportunities for the user, and allow the user to select one or more customer opportunities.

The on-board computer 114 or mobile device 110 may also be configured to communicate with the vehicle 108 utilizing a Bluetooth communication protocol, for instance. In some embodiments, the on-board computer 114 or mobile device 110 may communicate with vehicle 108, such as via a vehicle controller (not shown), or a vehicle telephony, entertainment, navigation, or information system (not shown) of the vehicle 108.

In some embodiments, the front-end components 102 may communicate with the back-end components 104, such as the server 140, via a network 130. As such, the back-end components 104 may receive historical route data that was collected by the front-end components 102. The on-board computer 114 and mobile device 110 may be configured to send historical route data to and/or receive data from network 130 using one or more suitable communication protocols, such as a Wi-Fi direct protocol, an ad-hoc cellular communication protocol, and the likes. Network 130 may be a proprietary network, a secure public internet, a virtual private network or some other type of network, such as dedicated access lines, plain ordinary telephone lines, satellite links, cellular data networks, or a combination thereof. Network 130 may be implemented as a wireless telephony network (e.g., GSM, CDMA, LTE, etc.), a Wi-Fi network (e.g., via one or more IEEE 802.11 Standards), a WiMAX network, a Bluetooth network, and the likes. The network 130 may include one or more radio frequency communication links, such as wireless communication links 112 and 118 with the mobile device 110 and on-board computer 114, respectively. Where the network 130 comprises the Internet, data communications may take place over the network 130 via an Internet communication protocol.

In further embodiments, the front-end components 102 may include an infrastructure communication device 124 for monitoring the status of one or more infrastructure components 126. Infrastructure components 126 may include roadways, bridges, traffic signals, gates, switches, crossings, parking lots or garages, toll booths, docks, hangars, or other similar physical portions of a transportation system's infrastructure. Further, the infrastructure components 126 may be temporary fixtures or components such as road construction signs or vehicles, emergency vehicles, and the likes. The infrastructure communication device 124 may include or be communicatively connected to one or more sensors (not shown) for detecting and receiving information relating to the condition of the infrastructure component 126, such as weather conditions, traffic conditions, or operating conditions of the infrastructure component 126. The infrastructure communication device 124 may further be configured to communicate the received information to vehicle 108 via the communication component 122. In some embodiments, the infrastructure communication device 124 may receive information from the vehicle 108, while, in other embodiments, the infrastructure communication device 124 may only transmit information to the vehicle 108. The infrastructure communication device 124 may be configured to transmit information regarding driving conditions on the route to assist in determining route riskiness.

Server 140 may receive or collect historical route data from the front-end components 102 via the network 130, store the received historical route data in database 146 or program memory 160, process the received historical route data (e.g., calculate the risk index based upon the historical route data), and/or communicate information associated with the received or processed historical route data back to the front-end components 102. Further, the server 140 may access data stored in database 146 when classifying or identifying high risk or hazardous routes, execute various functions and tasks associated with generating a customer opportunity.

The server 140 may comprise a controller 155 that is operatively connected to the database 146 via a link 156. The controller 155 may also be operatively connected to the network 130 via a link 135. The controller 155 may include a program memory 160, a processor 162, a random-access memory (RAM) 164, and an input/output (I/O) circuit 166, all of which may be interconnected via an address/data bus 165. Similarly, the memory of the controller 155 may include multiple RAMs 164 and multiple program memories 160. The RAM 164 and program memory 160 may be implemented as semiconductor memories, magnetically readable memories, or optically readable memories, for example. The program memory 160 may store various software applications, which may include a risk index application 143 and a customer opportunity determination application 144. The risk index application 143 may determine risk indices for traversed routes. The customer opportunity determination application 144 may determine and select customer opportunities suitable for the driver based on the risk indices. As such, both the risk index application 143 and travel route determination application 144 may have access to the risk index calculated by processor 162. The various software applications may be executed by the same computer processor 162 or by different computer processors.

In some embodiments, one or more portions of the server 140 may be implemented as one or more storage devices that are physically co-located with server 140, or as one or more storage devices utilizing different storage locations as a shared database structure (e.g. cloud storage). In some embodiments, server 140 may be configured to perform any suitable portion of the processing functions remotely that have been outsourced by mobile device 110 or the on-board computer 114. For example, mobile device 110 may collect historical route data as described herein, but may send the historical route data to server 140 for remote processing by the server 140 instead of processing the historical route data locally. In such embodiments, server 140 may receive and process the historical route data to determine or select appropriate customer opportunities, and may further generate and/or transmit an alert depicting the customer opportunity to the mobile device 110 or on-board computer 114 or take other actions.

Figure 2:
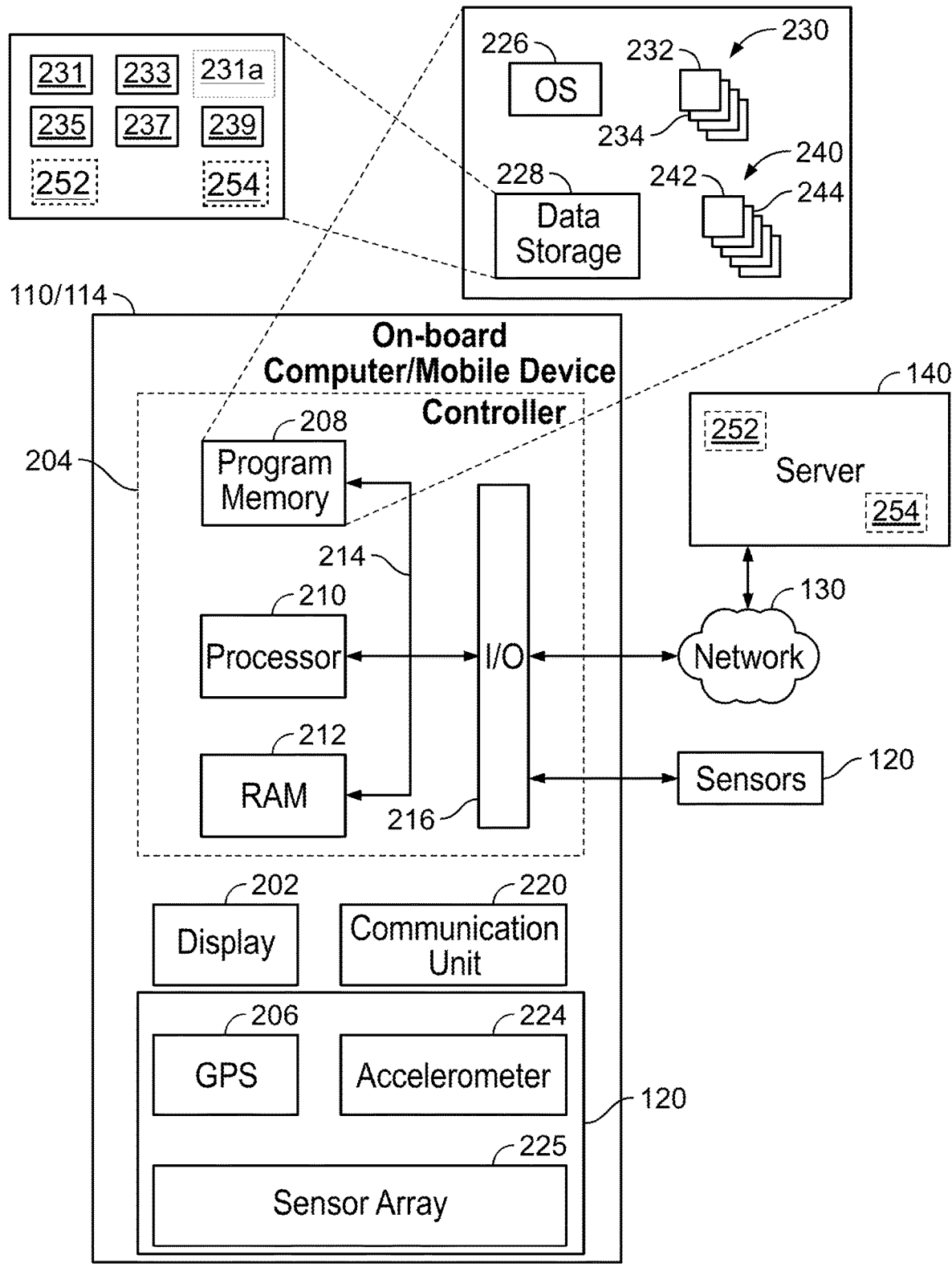
FIG. 2 illustrates a block diagram of an exemplary on-board computer or mobile device according to one embodiment.

FIG. 2 illustrates a block diagram of a system 200 including mobile device 110 or an on-board computer 114 and server 140 consistent with the system 100 of FIG. 1. The mobile device 110 or on-board computer 114 may include a display 202, a controller 204, a GPS unit 206, a communication unit 220, an accelerometer 224, a sensor array 225 (e.g., one or more cameras, accelerometers, gyroscopes, magnetometers, barometers, thermometers, proximity sensors, light sensors, Hall Effect sensors, radar units) and one or more user-input devices (not shown), such as a keyboard, mouse, microphone, or any other suitable user-input device. The communication unit 220 may provide input signals to the controller 204 via the I/O circuit 216, and may also transmit sensor data, device status information, control signals, or other output from the controller 204 to one or more external sensors within the vehicle 108 or server 140. The one or more sensors of the sensor array 225 may be positioned to determine telematics data regarding the speed, force, heading, and/or direction associated with movements of the vehicle 108. In some embodiments, the mobile device 110 or on-board computer 114 may be integrated into a single device, and in other embodiments, may be separate devices.

Similar to the controller 155 of FIG. 1, the controller 204 may include a program memory 208, one or more processors 210 (e.g., microcontrollers or microprocessors), a RAM 212, and the I/O circuit 216, all of which are interconnected via an address/data bus 214. The program memory 208 may include an operating system 226, a data storage 228, a plurality of software applications 230, and/or a plurality of software routines 240. The operating system 226, for example, may include one of a plurality of general purpose or mobile platforms, such as the Android™, iOS®, or Windows® operating systems. Alternatively, the operating system 226 may be a custom operating system designed for vehicle operation using the on-board computer 114. The data storage 228 may include data such as user profiles and preferences, application data for the plurality of applications 230, routine data for the plurality of routines 240, and other data related to road navigation and/or vehicle operation features. In some embodiments, the controller 204 may also include, or otherwise be communicatively connected to, other data storage mechanisms (not shown), such as hard disk drives, optical storage drives, or solid state storage devices located within the vehicle 108.

As discussed with reference to the controller 155, it should be appreciated that although FIG. 2 depicts only one processor 210, the controller 204 may include multiple processors 210. Processor 210 may be configured to execute any of one or more of the plurality of software applications 230 or any one or more of the plurality of software routines 240 residing in the program memory 208, in addition to other software applications. Similarly, the controller 204 may include multiple RAMs 212 and multiple program memories 208. RAM 212 and program memory 208 may be semiconductor memories, magnetically readable memories, or optically readable memories, for example.

As discussed with reference to the program memory 160 in FIG. 1, data storage 228 may store various software applications 230 implemented as machine-readable instructions, which may include a risk index application 232 and a customer opportunity determination application 234. The risk index application 232 may determine the driver's risk based on previously traveled routes. The customer opportunity determination application 234 may generate various customer opportunities based on the determination of the risk index application 232. The various software applications may be executed by the same computer processor 210 or by different computer processors. The various software applications 230 may call various software routines 240, such as risk index calculating routine 242 and/or a customer opportunity determination routine 244 to execute the various software applications 230.

Figure 3:
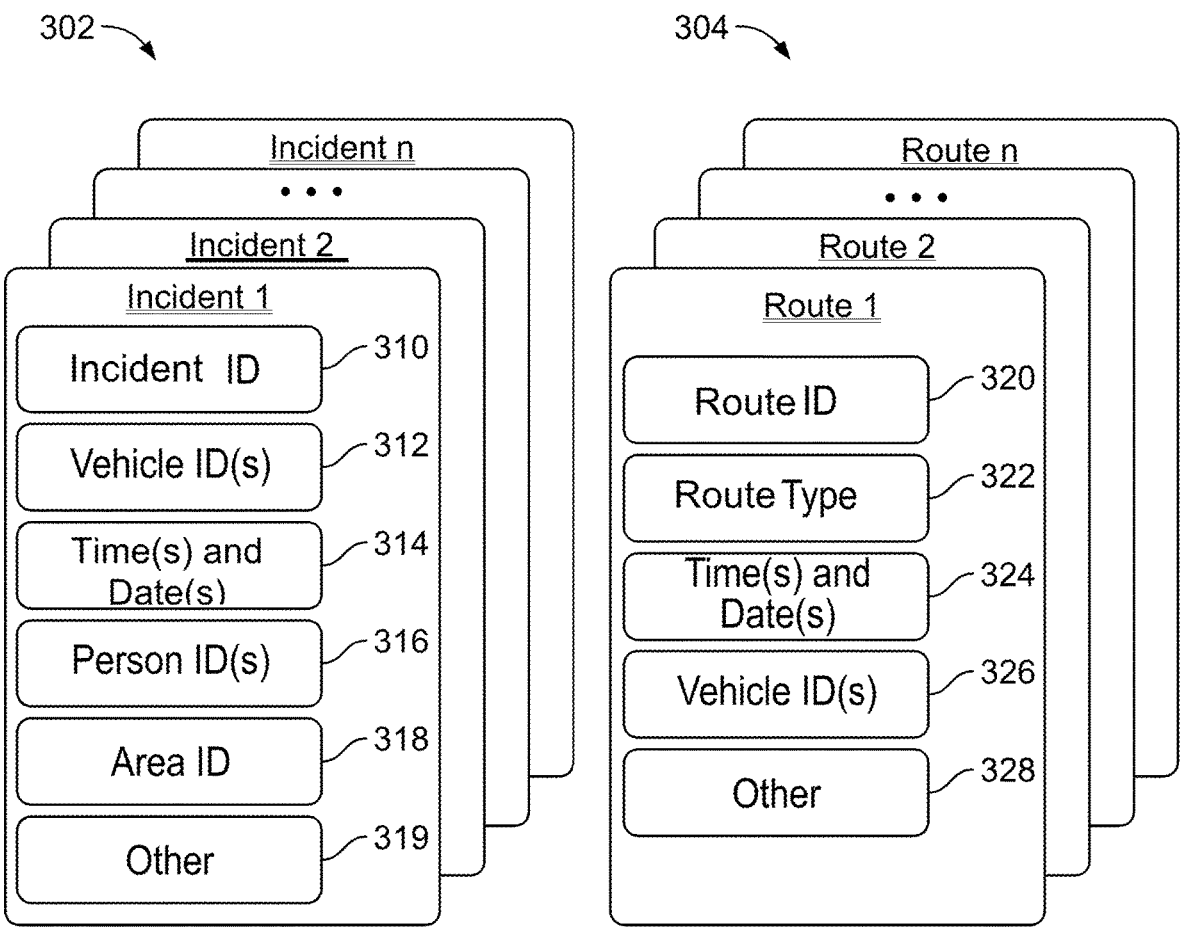
FIG. 3 illustrates exemplary historical traffic data according to one embodiment.
Figure 4:
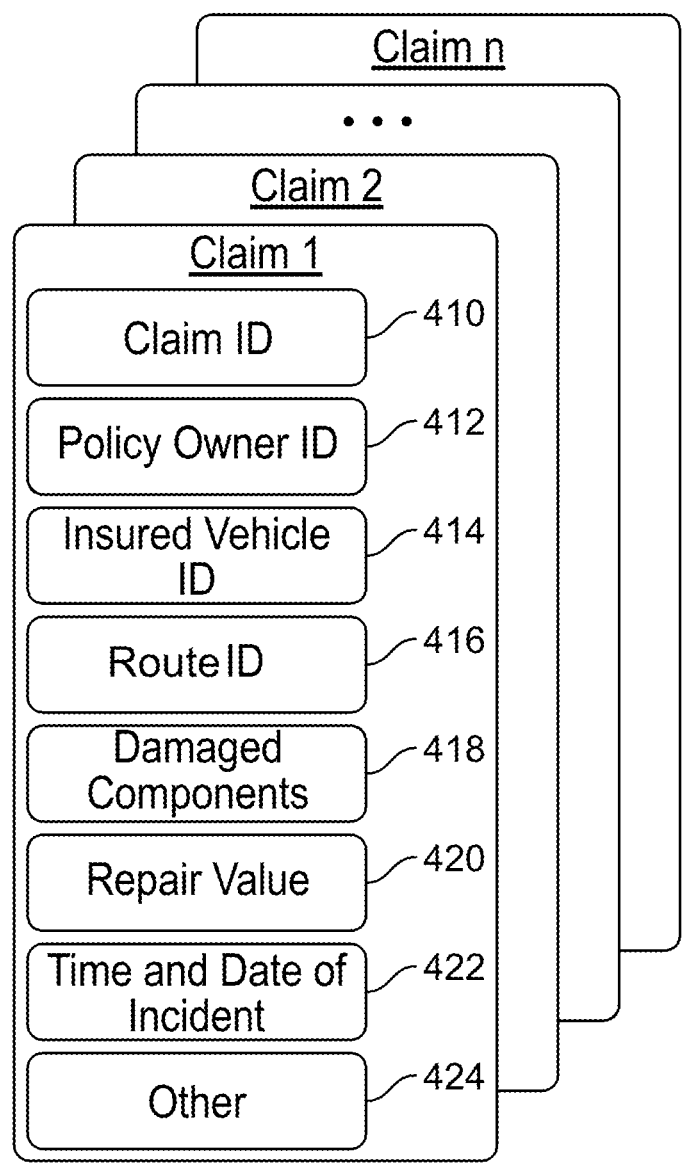
FIG. 4 illustrates exemplary claims data according to one embodiment.

In addition to applications and routines, the data storage 228 may store various data, such as observed collision and incident data 233, risk index data 235, monitored travel route data 237, and/or notification data 239. In one embodiment, the data storage 228 may include historical route data 252 and/or claims data 254. In other embodiments, historical route data 252 and/or claims data 254 may be stored in database 146 managed by server 140. Exemplary historical data 252 is shown in FIG. 3, and exemplary claims data 254 is shown in FIG. 4.

For example, historical route data 252 may be associated with a number of non-collision incidents occurring on the traversed routes and a frequency that the routes are traversed. Example non-collision incidents include traffic citations (e.g., speeding tickets), police reports, and the like. These non-collision incidents may provide a supplementary insight to the risk level of traversed routes. Examples of potential events that may impact route risk include traffic citations (which may be indicative of improper speeding zones), increased or decreased traffic, and road engineering occurrences (e.g., construction, lane blockages, and the like) on the route.

For example, claims data 254 may be associated with actual insurance claims arising from real world vehicle collisions or otherwise de-identified auto insurance claim data. Claims data 254 generally represents insurance claims filed by insurance policy owners. The claims data 254 may identify a particular collision, policy owners, involved vehicles, a location where the collision occurred, property involved, repair and/or replacement costs and/or estimates, a time and date of the collision, and/or various other information. In one embodiment, actual claim images (such as mobile device images of damaged vehicles, or images acquired via vehicle-mounted cameras and/or sensors) may be analyzed to associate an amount of physical damage shown in one or more images of vehicles involved in a vehicle collision with a repair or replacement cost of the vehicles. The actual claim images may be used to estimate repair or replacement cost for vehicles involved in past, recent, or current vehicle collisions. The processor 210 may then analyze the historical traffic data 252 to calculate a risk index for a particular route the driver has traversed.

The processor 210 may receive data identifying observed collisions and other incidents from server 140 for the same routes the driver has previously traversed. For example, in some embodiments, the processor 210 may transmit a query to server 140 managing the historical route data 252 and the claims data 254 in order to receive data identifying traversed routes and corresponding observed collisions and incidents from server 140. The processor 210 or server 140 may identify from data collisions and incidents that occurred along the routes the driver traversed within a particular time period from when travel occurred. The number of identified collisions and incidents resulting from the query may be saved to the data storage 228 as observed collision and incident data 233.

Upon monitoring and storing data describing the routes traversed by the vehicle, the processor 210 may next compare the observed collisions and the number of other incidents or events to calculate the risk index to evaluate the riskiness of the traversed routes. The processor 210 may calculate and store the resulting value to the data storage 228 as risk index data 235 for the traversed routes. In some examples, an average risk index may be calculated for all of the routes traversed by the vehicle in the designated time frame. The resulting numerical value may be compared to a threshold value or values representing one or more risk level cut offs. Depending on where the average risk index lies relative to the threshold value or values, the processor 210 may generate appropriate customer opportunities.

In some examples, the system 200 may provide navigation or other route information to the user. The navigation features may account for route riskiness prior to transmitting potential routes to the user, and may present risk level to the user. The system 200 may monitor whether the user took the suggested, less-risky route, and may generate customer opportunities based on whether the suggested route was taken a certain number of times. Vehicle owners that display risk averse driving behavior and avoid hazardous areas, or choose an alternative, less risk-prone mode of travel may be rewarded with customer opportunities in the form of lower premiums or higher discounts on auto or other types of insurance. Subsequently, the insurance provider remote server 140 may transmit adjusted auto insurance premium or discounts to a mobile device 110 to incentivize safer vehicle operation.

Figure 6:
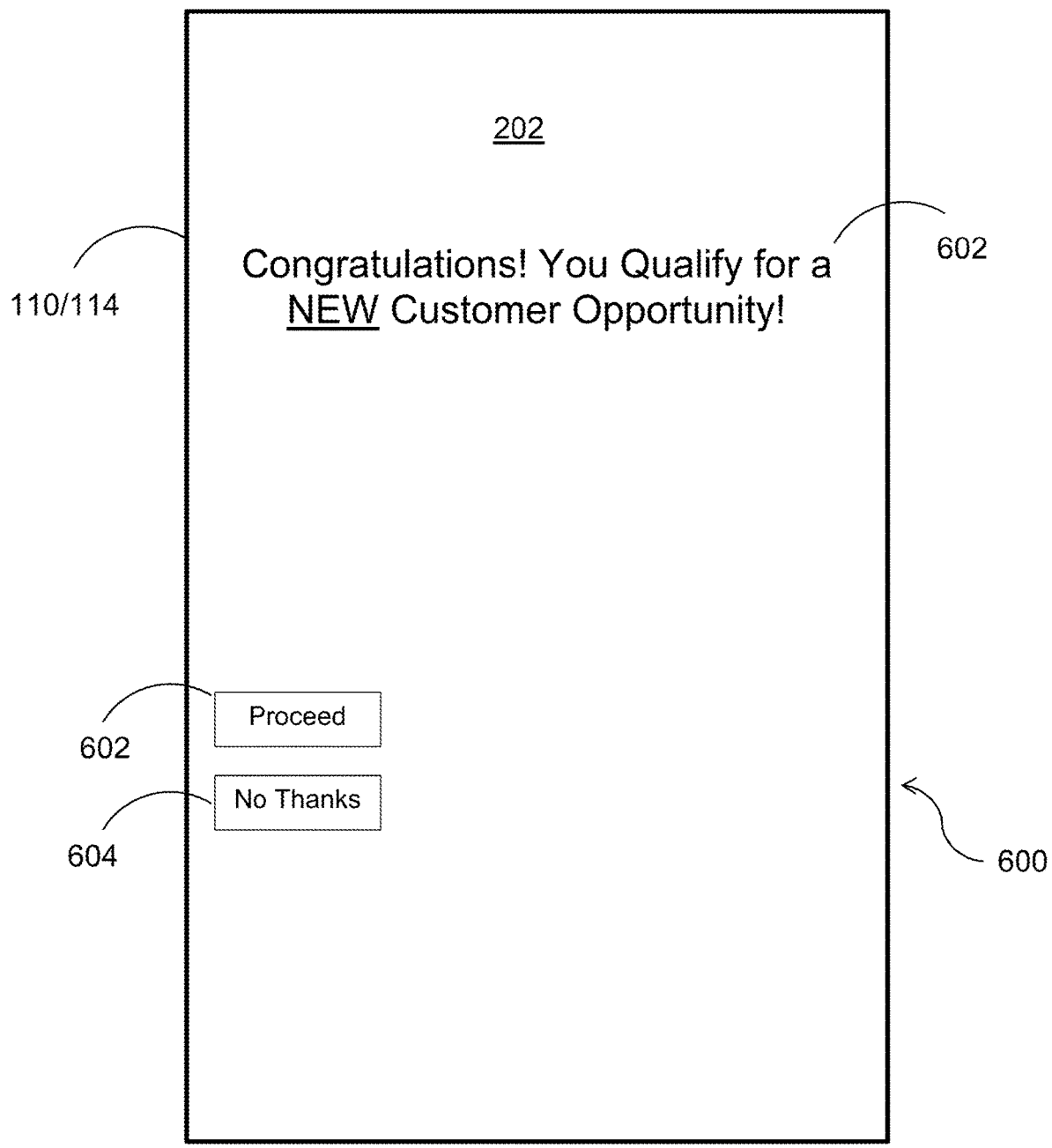
FIGS. 6 and 7 illustrate an exemplary user interface according to one embodiment.

First, the processor 210 may identify a suitable period of time to access monitored traversed routes. In some examples, this period may be routes traversed within the last one to 12 months. Second, the processor 210 may cause the risk index application 232 to determine or calculate risk indices associated with each route traversed within the time frame. Third, the processor 210 may cause the customer opportunity determination application 234 to generate any number of customer opportunities for the driver. Fourth, the processor 210 may transmit an alert indicating the availability of the customer opportunity to the mobile device 110 and/or on-board computer 114. In some embodiments, a graphic element may be a depiction of the alert (as illustrated in FIG. 6).

In another example operation, server 140 may (i) monitor and store routes traversed by the vehicle; (ii) access historical traffic data 252 and/or auto claim data 254 via wireless communication or data transmission over one or more radio links or wireless communication channels; (iii) calculate a risk index based on the historical traffic data 252 and/or auto claim data 254; and (iv) determine at least one customer opportunity based on the calculated risk index. Subsequently, server 140 may transmit the customer opportunity to vehicle 108, mobile device 110, or wearable electronics of a user via wireless communication or data transmission over one or more radio links or wireless communication channels.

FIG. 3 further illustrates example historical traffic data 252 that was described in FIG. 2, according to one embodiment. The historical traffic data 252 may include incident data 302 and/or route data 304.

The incident data 302 may include records for multiple incidents. For each incident, the incident data 302 may include a record of relevant information. Each incident record may include or reference one or more of: an incident identifier (ID) 310 unique to the incident; vehicle ID(s) 312 identifying the vehicle(s) involved in the incident; time and date data 312 identifying when the incident occurred; person ID(s) 316 identifying people involved in the incident (e.g., policy holders); an area ID 318 identifying a location of the incident; and/or other data 319. The system 200 may utilize the incident data 302, e.g., to identify a number of incidents for the particular routes traversed within a particular time period.

The route data 304 may include records for multiple routes. For each route, the route data 304 may include a record of relevant information. Each route record may include or reference one or more of: a route ID 320 unique to the route; a route type 322 identifying a route type (e.g., bridge, street, intersection, highway, and the likes); times and/or dates 324 of observed traffic on the route; vehicle ID(s) 326 identifying vehicles observed on the route; and/or other data 328. The system 200 may utilize the route data 304 to, e.g., calculate a traffic volume for a given route for a time period (e.g., over a week, month, year, and the likes).

FIG. 4 further illustrates example claims data 254 according to one embodiment. The claims data 254 may include records for multiple insurance claims filed by policy holders on the traversed routes. For each claim, the claims data 254 may include a record of relevant information. Each claim record may include or reference one or more of: a claim ID 410 unique to the claim; a policy owner ID 412 unique to the policy holder who filed the claim; a vehicle ID 414 unique to the vehicle owned by the policy holder; a route ID 416 unique to the route where the incident or collision occurred; damaged components data 418 identifying the property damage resulting from the incident or property; a repair or replacement value 420 describing the costs associated with repairing or replacing the damaged components; time and date information 422 unique to the time when the incident or collision occurred; and/or other information 424, such as data indicating a number and extent of personal injuries resulting from a vehicle collision and/or data indicating an extent of liability damages resulting from a vehicle collision. The system 200 may analyze the claims data 254 to identify a number of collisions involving policy holders for a particular area within a particular time period. The system 200 may compare this number of collisions to a market-adjusted expected collisions number, enabling a calculation of a risk index particular to a particular market (e.g., to identify a risk index for a route specific to customers of a particular insurance company).

The processor 210 may store the risk index and/or customer opportunity to the data storage 228 as notification data 239. In some embodiments, the processor 210 may display the customer opportunity via the display 202. The customer opportunity may be depicted as a pop up, using various colors, for example, to indicate different levels of customer opportunities. An example customer opportunity is shown in FIG. 6.

In some examples, a user may receive the displayed customer opportunity without being prompted. In these examples, the customer opportunity may be in the form of a discount for renewing an existing policy that may be near an expiration date. In other examples, the user may first request a new policy (or to renew an existing policy), and upon a calculation of the user's relative risk index, a customer opportunity may be presented to the user, if applicable.

Figure 5:
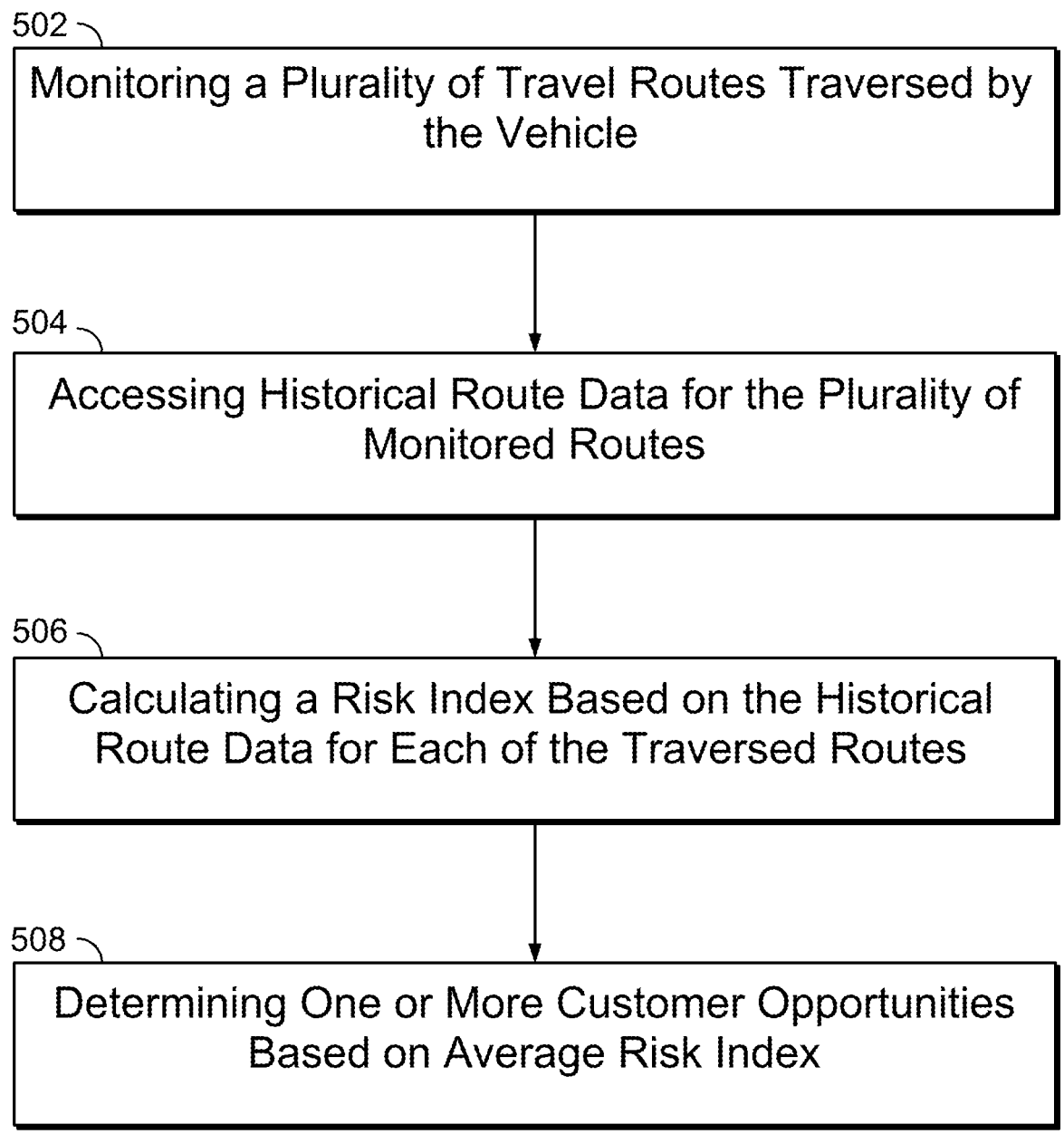
FIG. 5 illustrates a flowchart for identifying customer opportunities according to one embodiment.

FIG. 5 illustrates a computer-implemented method 500 for identifying customer opportunities according to one embodiment. The method 500 may be implemented, in whole or in part, by the systems 100 or 200 shown in FIGS. 1 and 2, implemented via one or more processors (e.g., processor 210 or processor 162), transceivers, and/or sensors 120, and/or via computer-executable instructions stored on non-transitory computer-readable medium or media. Accordingly, in some embodiments, server 140 having access to historical traffic data 252 and/or claims data 254 may carry out the method 500. In other embodiments, on-board computer 114 or mobile device 110 having memory that stores historical traffic data 252 and/or claims data 254 may carry out the method 500. In other embodiments, on-board computer 114 or mobile device 110 may retrieve historical traffic data 252 and/or claims data 254 from server 140 and subsequently carry out the method 500. The method 500 may be stored in memory (e.g., program memory 208) or a database (e.g., database 146) as one or more instructions or routines.

The method 500 may begin by monitoring travel routes traversed by the vehicle (block 502). In some examples, the traveled routes may already have been monitored, and thus data representative of these routes may already be stored on a memory device. Accordingly, the method 500 may simply access the memory to obtain the previously monitored routes.

Next, the method accesses historical route data for the monitored routes (block 504). The historical route data 252 may include data regarding the number of collisions and incidents on the monitored routes over the desired time period. Claims data 254, for instance, may be utilized to identify the number of actual collisions observed along the route.

Method 500 may then calculate a risk index for the routes based upon the historical route data 252 (block 506). A risk index value greater than a specified number may indicate that the route is deemed risky, and conversely, a risk index value less than the specified number may indicate that the route is deemed safe. The risk indices for each route are averaged to arrive at an average risk index.

Method 500 may then determine one or more customer opportunities based on the average calculated risk index (block 508), and may present the one or more customer opportunities to the user.

In some examples, a user may select a desired customer opportunity after being presented with any number of potential customer opportunities. The method 500 may then adjust an existing or future insurance premium to reflect the customer opportunity being redeemed by the user.

Figure 7:
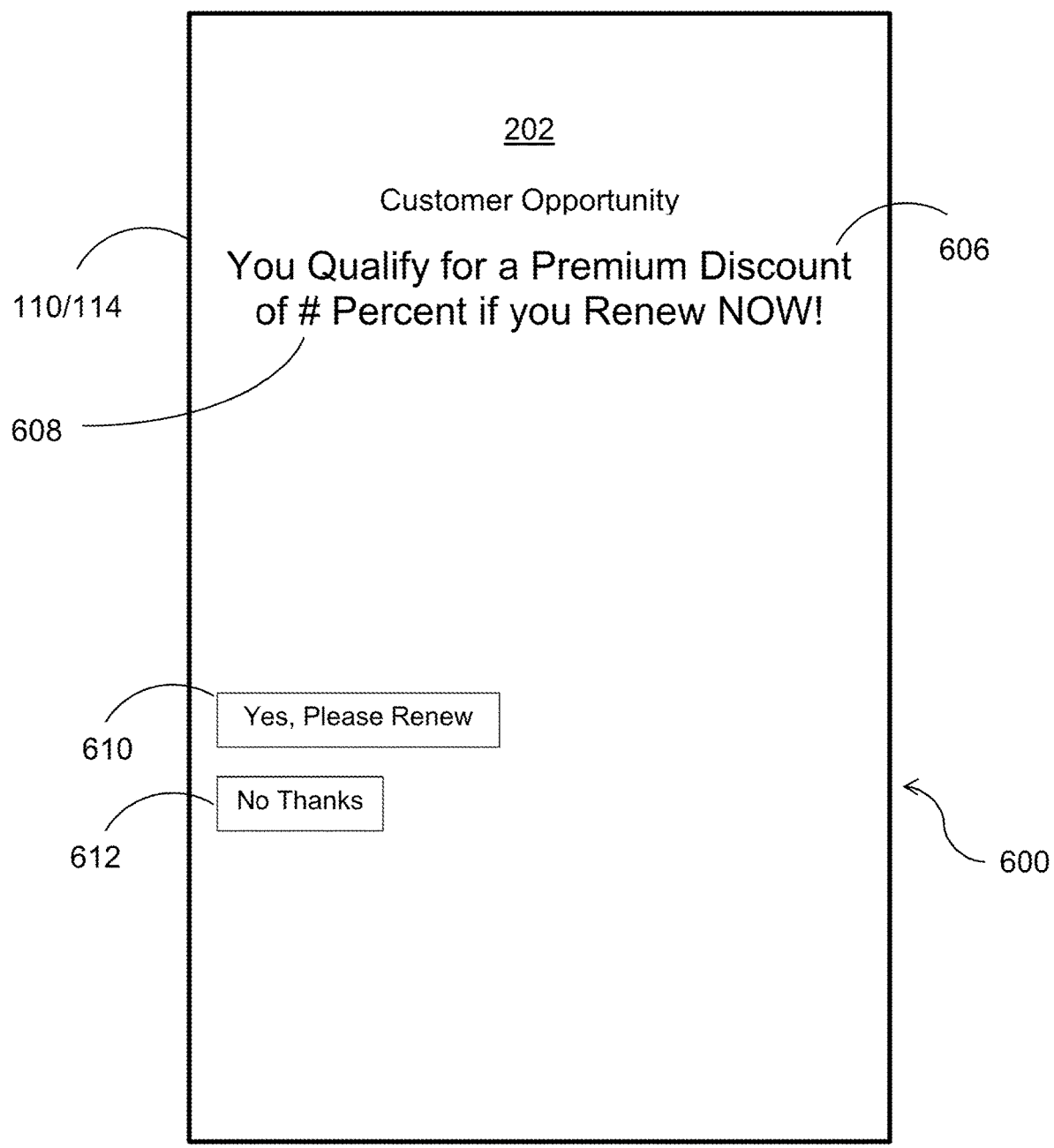

As illustrated in FIGS. 6 and 7, an example interface 600 is provided that illustrates the availability of a customer opportunity. The interface 600 may be contained within an application stored on data storage 228, and may be presented on the display 202 of the mobile device 110 and/or on-board computer 114 of FIG. 2. The interface 600 may be presented on the display 202 as an alert, notification, or other pop-up that a user must first open prior to viewing the customer opportunity. As illustrated in FIG. 6, the interface 600 includes text 602 informing the user of a new customer opportunity. The interface 600 includes a proceed button or selection 602 that causes the interface 600 to show the customer the customer opportunity, and a decline button or selection 604 that causes the interface 600 to exit.

If the user wishes to view the customer opportunity, they may select the proceed button 602. Accordingly, as illustrated in FIG. 7, the customer opportunity is provided by the interface 600. The customer opportunity includes standardized text 606 informing the user of the type of customer opportunity. In the illustrated example, the customer opportunity is a premium discount if they renew their insurance plan. The interface also includes a modifiable value 608 that adjusts based on the value of the customer opportunity. For example, the modifiable value 608 may be, for some users, 5%, 10%, or 15%. Other examples are possible, and are determined by the customer opportunity determination application 234 previously discussed.

The interface 600 further includes an accept button 610 and a decline button 612. If the user desires to accept the customer opportunity, they may select the accept button 610, whereupon additional processing may occur. Conversely if the user wishes to decline the customer opportunity, they may select the decline button 612, and the interface 600 may then terminate. In some examples, the user may take advantage of a number of customer opportunities. In these examples, the interface 600 may present each customer opportunity on a single page, or may require the user to select a button to advance them to a later page.

It is understood that in some examples, a customer may wish to obtain an on-demand insurance premium. If the customer has previously used the systems 100 or 200, and had previously driven routes monitored, the customer opportunity determination application 234 may determine if any customer opportunities are available based on previous vehicle usage, and may present these opportunities to the user during the process of obtaining an on-demand insurance plan. Similarly, a user may not be an existing customer, but may wish to obtain a standard length (e.g., 6 or 12 months) insurance premium. If the potential customer has a past record of driven routes, the customer opportunity determination application 234 may determine if any customer opportunities are available based on this previous vehicle usage.

Those skilled in the art will recognize that a wide variety of modifications, alterations, and combinations can be made with respect to the above described embodiments without departing from the scope of the invention, and that such modifications, alterations, and combinations are to be viewed as being within the ambit of the inventive concept.

The patent claims at the end of this patent application are not intended to be construed under 35 U.S.C. § 112(f) unless traditional means-plus-function language is expressly recited, such as "means for" or "step for" language being explicitly recited in the claim(s). The systems and methods described herein are directed to an improvement to computer functionality, and improve the functioning of conventional computers.

What is claimed is:

1. A computer-implemented method, carried out by one or more processors, the computer-implemented method comprising:

sending, by the one or more processors and via a network, control signals to one or more sensors associated with a vehicle to cause the one or more sensors associated with the vehicle to capture vehicle usage data associated with the vehicle, and wherein the one or more sensors are positioned to determine telematics data including one or more of a speed, a force, a heading, or a direction associated with movements of the vehicle;

receiving, by the one or more processors and via the network, the vehicle usage data from the one or more sensors associated with the vehicle to determine a plurality of routes traversed by the vehicle for a particular time period, wherein the one or more sensors include one or more of: a GPS unit, a digital camera, a video camera, a LIDAR sensor, an ultrasonic sensor, an infrared sensor, an ignition sensor, an odometer, a system clock, a speedometer, a tachometer, an accelerometer, a gyroscope, a compass, a geolocation unit, radar unit, and an inductance sensor;

accessing, by the one or more processors, a database to identify historical data having route and time identifiers that correspond to the plurality of routes traversed by the vehicle and the particular time period, respectively, wherein the historical data includes (i) historical route data associated with a number of non-collision incidents and (ii) claims data associated with a number of collision incidents, wherein the non-collision incidents comprise at least one of a number of traffic citations issued and a number of police reports;

determining, by the one or more processors, that a comparison of the number of collision incidents with the number of non-collision incidents exceeds a predetermined threshold;

assessing, by the one or more processors, that the plurality of routes traversed by the vehicle is hazardous based upon the comparison; and transmitting, by the one or more processors and to a navigation system associated with the vehicle via the network, a suggested route that avoids the plurality of routes.

2. The computer-implemented method of claim 1, further comprising generating, by the one or more processors, a modified insurance premium based on at least one customer opportunity.

3. The computer-implemented method of claim 2, further comprising:
transmitting, via the network, the modified insurance premium to an electronic device associated with a driver of the vehicle.

4. The computer-implemented method of claim 1, further comprising causing, by the one or more processors, a risk index to be presented at an electronic device associated with a driver of the vehicle.

5. The computer-implemented method of claim 1, further comprising:
transmitting, by the one or more processors, a virtual alert to an electronic device associated with a driver of the vehicle, via the network, causing the electronic device to display:
a first indication including at least one customer opportunity when the vehicle is determined to have traversed the suggested route; or
a second indication excluding the at least one customer opportunity when the vehicle is determined not to have traversed the suggested route.

6. The computer-implemented method of claim 1, wherein the one or more sensors are positioned to determine telematics data including one or more of a speed, a force, a heading, or a direction associated with movements of the vehicle.

7. A server comprising:
a memory configured to store non-transitory computer executable instructions; and a processor configured to interface with the memory, wherein the processor is configured to execute the non-transitory computer executable instructions to cause the processor to:
send, via a network, control signals to one or more sensors associated with a vehicle to cause the one or more sensors associated with the vehicle to capture vehicle usage data associated with the vehicle; and wherein the one or more sensors are positioned to determine telematics data including one or more of a speed, a force, a heading, or a direction associated with movements of the vehicle;
receive, via the network, the vehicle usage data from the one or more sensors associated with the vehicle to determine a plurality of routes traversed by the vehicle for a particular time period, wherein the one or more sensors include one or more of: a GPS unit, a digital camera, a video camera, a LIDAR sensor, an ultrasonic sensor, an infrared sensor, an ignition sensor, an odometer, a system clock, a speedometer, a tachometer, an accelerometer, a gyroscope, a compass, a geolocation unit, radar unit, and an inductance sensor;
access a database to identify historical data having route and time identifiers that correspond to the plurality of routes traversed by the vehicle and the particular time period, respectively, wherein the historical data includes (i) historical route data associated with a number of non-collision incidents and (ii) claims data associated with a number of collision incidents, wherein the non-collision incidents comprise at least one of a number of traffic citations issued and a number of police reports; determine that a comparison of the number of collision incidents with the number of non-collision incidents exceeds a predetermined threshold; assess that the plurality of routes traversed by the vehicle is hazardous based upon the comparison; and transmit, to a navigation system associated with the vehicle via the network, a suggested route that avoids the plurality of routes.

8. The server of claim 7, wherein the processor is further configured to receive a request for an insurance premium for vehicular travel.

9. The server of claim 8, wherein the processor is further configured to generate a modified insurance premium based on at least one customer opportunity.

10. The server of claim 9, further comprising:
a transceiver coupled to the processor, the transceiver configured to transmit, via the network, the modified insurance premium to an electronic device associated with a driver of the vehicle.

11. The server of claim 7, wherein the processor is further configured to execute the non-transitory computer executable instructions to cause the processor to present a risk index at an electronic device associated with a driver of the vehicle.

12. The server of claim 7, wherein the processor is further configured to:
transmit virtual alert to an electronic device associated with a driver of the vehicle, via the network, causing the electronic device to display:

a first indication including at least one customer opportunity when the vehicle is determined to have traversed the suggested route; or a second indication excluding the at least one customer opportunity when the vehicle is determined not to have traversed the suggested route.

13. The server of claim 7, wherein the one or more sensors are positioned to determine telematics data including one or more of a speed, a force, a heading, or a direction associated with movements of the vehicle.

14. A non-transitory computer readable medium containing a set of computer readable instructions, that when executed by a processor configure the processor to:

send, via a network, control signals to one or more sensors associated with a vehicle to cause the one or more sensors associated with the vehicle to capture vehicle usage data associated with the vehicle; and wherein the one or more sensors are positioned to determine telematics data including one or more of a speed, a force, a heading, or a direction associated with movements of the vehicle;

receive, via the network, the vehicle usage data from the one or more sensors associated with the vehicle to determine a plurality of routes traversed by the vehicle for a particular time period, wherein the one or more sensors include one or more of: a GPS unit, a digital camera, a video camera, a LIDAR sensor, an ultrasonic sensor, an infrared sensor, an ignition sensor, an odometer, a system clock, a speedometer, a tachometer, an accelerometer, a gyroscope, a compass, a geolocation unit, radar unit, and an inductance sensor;

access a database to identify historical data having route and time identifiers that correspond to the plurality of routes traversed by the vehicle and the particular time period, respectively, wherein the historical data includes (i) historical route data associated with a number of non-collision incidents and (ii) claims data associated with a number of collision incidents, wherein the non-collision incidents comprise at least one of a number of traffic citations issued and a number of police reports;

determine that a comparison of the number of collision incidents with the number of non-collision incidents exceeds a predetermined threshold; assess that the plurality of routes traversed by the vehicle is hazardous based upon the comparison; and transmit, to a navigation system associated with the vehicle via the network, a suggested route that avoids the plurality of routes.

15. The non-transitory computer readable medium of claim 14, wherein the processor is further configured to:

receive a request for an insurance premium for vehicular travel; and generate a modified insurance premium based on at least one customer opportunity.

16. The non-transitory computer readable medium of claim 15, that when executed by a transceiver, configure the transceiver to:

transmit, via the network, the modified insurance premium to an electronic device associated with a driver of the vehicle.

17. The non-transitory computer readable medium of claim 14, wherein the non-collision incidents comprise at least one of a number of traffic citations issued and a number of police reports.

18. The non-transitory computer readable medium of claim 14, wherein the set of computer readable instructions is further configured to cause the processor to present a risk index at an electronic device associated with a driver of the vehicle.

19. The non-transitory computer readable medium of claim 14, wherein the processor is further configured to:

transmit a virtual alert to an electronic device associated with a driver of the vehicle, via the network, causing the electronic device to display:

a first indication including at least one customer opportunity when the vehicle is determined to have traversed the suggested route; or a second indication excluding the at least one customer opportunity when the vehicle is determined not to have traversed the suggested route.

20. The non-transitory computer readable medium of claim 14, wherein the one or more sensors are positioned to determine telematics data including one or more of a speed, a force, a heading, or a direction associated with movements of the vehicle.

* * * * *